Figure 1:
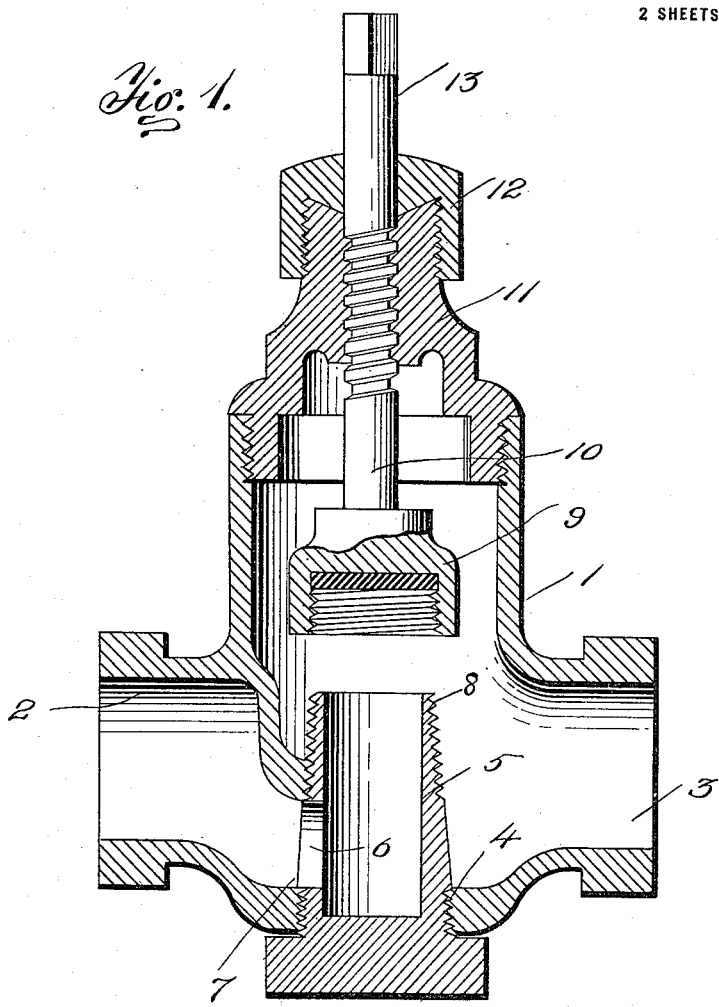

G. OBERT.
VALVE.
APPLICATION FILED OCT. 19, 1912.

1,147,968.

Patented July 27, 1915.
2 SHEETS—SHEET 1.

Witnesses
M. P. McKee
O. H. Book

Inventor
G. Obert

By Alex. J. Wedderburn, Jr.
Attorney

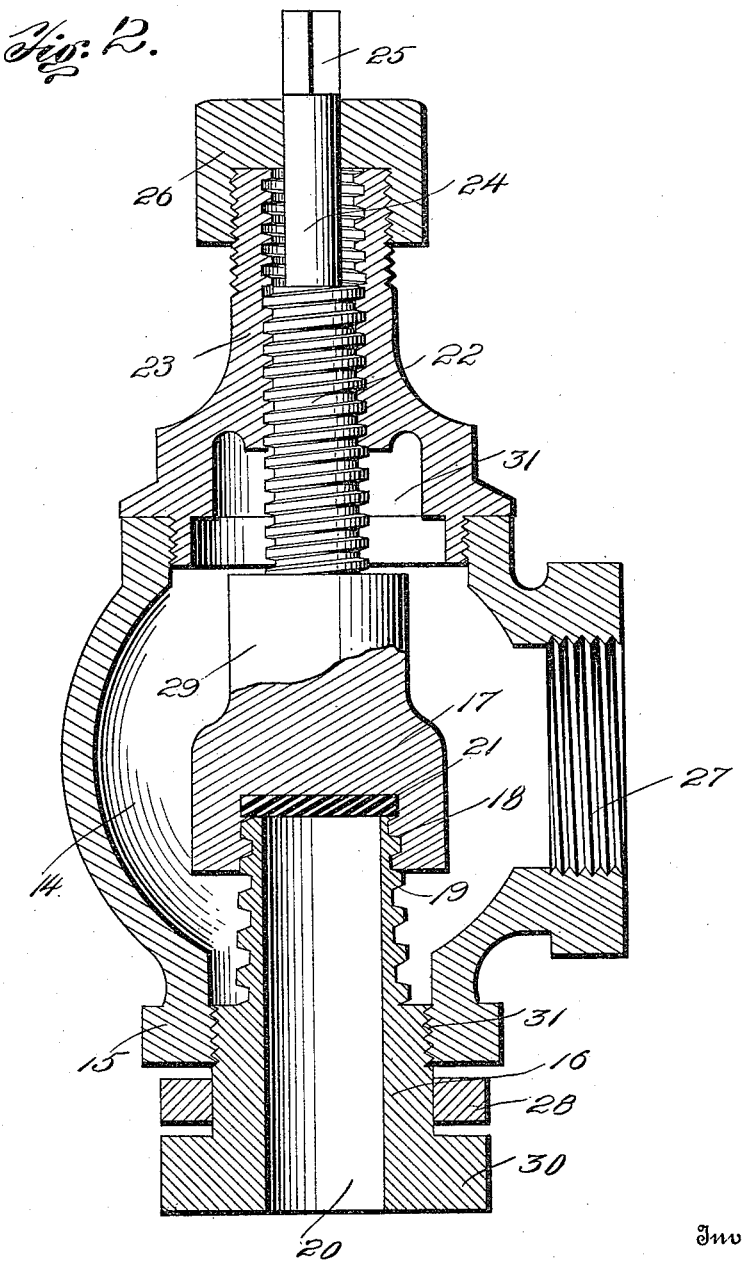

UNITED STATES PATENT OFFICE.

GUSTAV OBERT, OF DANVILLE, ILLINOIS.

VALVE.

1,147,968.  Specification of Letters Patent.  Patented July 27, 1915.

Application filed October 19, 1912. Serial No. 726,782.

*To all whom it may concern:*

Be it known that I, GUSTAV OBERT, a citizen of the United States, residing at Danville, in the county of Vermilion and State of Illinois, have invented certain new and useful Improvements in Valves, of which the following is a specification.

This invention relates to improvements in valves and has for its object to provide a durable economical and efficient blow off valve.

Another object is to provide a globe or other similar valve having a separable valve seat.

With the above and other objects in view I have invented the device illustrated in the accompanying drawings in which Figure 1 is a vertical sectional view through one form of my valve, Fig. 2 is a vertical sectional view through another form thereof.

In Fig. 1 1 indicates a valve chamber having an inlet port 2 and an outlet port 3. The chamber 1 has a screw-threaded opening 4 into which the valve seat 5 screws, said seat having the desired number of threads to the inch so that the opening 6 in said seat member will aline with the passage 7 of said inlet port 2. The valve seat 5 is hollow and smaller at its upper end 8 and externally screw-threaded at said upper end whereby the valve member 9 which is internally screw-threaded, may screw and seat thereon. Said member 9 depends from a valve stem 10 which is screwed into the bonnet 11 and projects through said bonnet and a packing cap 12 and has a squared end 13 to receive a key (not shown) whereby it may be operated.

In Fig. 2 is a different form of the invention in which the valve chamber 14 has screwed into its bottom 15 a valve seat 16 which is tubular and adapted to admit fluid into said chamber 14 when the valve member 17 is removed from its seat thereon. The member 17 is provided with an internally screw-threaded recess 18 which is adapted to screw onto the threads 19 on said seat 16 whereby the inlet 20 to said chamber 14 may be effectually closed. A gasket 21 is seated in said recess 18. Said member 17 is mounted on a stem 22 screwed into the bonnet 23 and is provided with a reduced portion 24 having a squared end 25 which projects through the packing nut 26. The chamber 14 is provided with an outlet port 27. The valve seat 16 is provided with a nut head 30 whereby it may be readily engaged by a wrench to screw it securely into the screw-threaded opening 31 in said bottom 15, and a packing 28 is interposed between said head 30 and said bottom 15. The bonnet 23 is provided with an internal cavity 31 adapted to receive the reduced portion 29 of said valve member 17.

It will be readily seen that fluid entering the inlet 20 will pass into the chamber 14 and out through the outlet port 27 but the passage may be effectually sealed by screwing the valve member down over the valve seat 16, said valve member being held doubly secure by its screw-threaded connection with the valve seat and also by its screw-threaded stem.

Having now described my invention that which I claim to be new and desire to procure by Letters Patent is:

1. In combination a globe valve casing having two internally screw-threaded ports arranged at a right angle to each other, a tubular member consisting of portions of three diameters, the portion of largest diameter being arranged exteriorly of said valve casing, the middle portion being screw-threaded into one of said ports, and the portion of smallest diameter being formed with relatively large screw-threads, said valve casing being formed with an internally-screw-threaded opening in alinement with said tubular-member receiving port, a valve bonnet screw-threaded into said opening, said bonnet having an internal bore formed with internal threads reduced relatively to the diameter of said tubular member, a solid valve having a single internal screw-thread arranged to engage the screw threads on the tubular member, and a screw-threaded integral stem formed upon said valve and being screwed into said bonnet.

2. In combination, a globe valve casing having two ports, a tubular member consisting of portions of three diameters, the portion of largest diameter being arranged exteriorly of said valve casing, the middle portion being screw-threaded into one of said ports, and the portion of smallest diameter being formed with relatively large screw-threads, said valve casing being formed with an internally-screw-threaded opening in alinement with said tubular member, a valve bonnet screw-threaded into said opening, said bonnet having an internal bore formed with internal threads reduced relatively to the diameter of said tubular member, a solid valve having a single internal screw-thread arranged to engage the screw-threads on the tubular member, and a screw-threaded integral stem formed upon said valve and screwed into said bonnet.

In testimony whereof I affix my signature in presence of two witnesses.

GUSTAV OBERT.

Witnesses:
E. K. SHUTTS,
FRITZ MAYER.

Copies of this patent may be obtained for five cents each, by addressing the "Commissioner of Patents, Washington, D. C."